(12) United States Patent
Han et al.

(10) Patent No.: US 11,870,290 B2
(45) Date of Patent: Jan. 9, 2024

(54) SYSTEM OF DETERMINING POWER GENERATION MARGIN FOR VEHICLE, CONTROL METHOD THEREOF AND POWER CONTROL APPARATUS

(71) Applicants: HYUNDAI MOTOR COMPANY, Seoul (KR); KIA CORPORATION, Seoul (KR)

(72) Inventors: Sang Jae Han, Hwaseong-si (KR); Changseob Lim, Suwon-si (KR); Shinhae Kim, Incheon (KR)

(73) Assignees: Ayundai Motor Company, Seoul (KR); Kia Corporation, Seoul (KR)

( * ) Notice: Subject to any disclaimer, the term of this patent is extended or adjusted under 35 U.S.C. 154(b) by 264 days.

(21) Appl. No.: 17/306,074

(22) Filed: May 3, 2021

(65) Prior Publication Data
US 2022/0080945 A1    Mar. 17, 2022

(30) Foreign Application Priority Data
Sep. 14, 2020    (KR) .................. 10-2020-0117570

(51) Int. Cl.
*B60W 20/00*    (2016.01)
*H02J 7/00*    (2006.01)
*B60K 6/26*    (2007.10)
*B60L 50/61*    (2019.01)
*B60R 16/033*    (2006.01)

(52) U.S. Cl.
CPC ........ *H02J 7/0068* (2013.01); *H02J 7/00714* (2020.01); *B60W 2510/244* (2013.01); *B60W 2520/105* (2013.01); *B60W 2520/125* (2013.01); *B60W 2710/248* (2013.01); *B60W 2710/305* (2013.01); *B60Y 2200/92* (2013.01); *B60Y 2300/91* (2013.01); *H02J 7/0014* (2013.01); *H02J 7/00047* (2020.01)

(58) Field of Classification Search
CPC ............ B60Y 2200/92; B60Y 2300/91; B60Y 2300/92; B60W 2510/244; B60W 2520/105; B60W 2520/125; B60W 2710/248; B60W 20/00; H02J 7/00714; H02J 7/0014; H02J 7/0068
See application file for complete search history.

(56) References Cited

U.S. PATENT DOCUMENTS

| | | | |
|---|---|---|---|
| 10,227,067 B2* | 3/2019 | Bell | B60W 10/08 |
| 11,535,237 B2* | 12/2022 | Akiyama | B60W 30/143 |
| 2006/0197346 A1* | 9/2006 | Maehara | F02D 29/06 |
| | | | 290/40 C |

FOREIGN PATENT DOCUMENTS

KR    20150064971 A   *  6/2015

* cited by examiner

*Primary Examiner* — Richard Isla
*Assistant Examiner* — Sadia Kousar
(74) *Attorney, Agent, or Firm* — Morgan, Lewis & Bockius LLP

(57) ABSTRACT

A vehicle includes: an electrical load; a generator; a battery; and a controller configured to, control the operation of the generator based on the charging rate of the battery, identify a power generation margin representing a ratio of the power that the generator can output to a maximum power based on the duty ratio of the input voltage applied to the generator, and reduce power consumption of the electrical load based on a comparison between the power generation margin and a target margin. The vehicle can prevent or minimize the voltage drop phenomenon of the generator by using the power generation margin of the generator.

14 Claims, 12 Drawing Sheets

FIG.8

| BATTERY CHARGING STATE | FIRST TARGET MARGIN RATE |
|---|---|
| INVALID | 0% |
| High | 0% |
| Normal | 5% |
| Low | 10% |
| Very Low | 20% |
| Critical | 30% |

FIG.9

| DRIVING STATE | SECOND TARGET MARGIN RATE |
|---|---|
| IDLE | 0% |
| ACCEL | 10% |
| DECEL | −10% |
| CONST | 0% |

FIG.10

| VOLTAGE SENSITIVE LOAD | THIRD TARGET MARGIN RATE |
|---|---|
| OFF | 0% |
| ON | 10% |

FIG.11

| DUTY CHANGE AMOUNT | FOURTH TARGET MARGIN RATE |
|---|---|
| INSTANTANEOUS INCREASE | 20% |
| MAINTAIN | 0% |

FIG.12

| BATTERY CHARGING STATE | POWER CONTROL LEVEL |
|---|---|
| INVALID | NONE (NO LIMIT) |
| High | NONE (NO LIMIT) |
| Normal | NONE (NO LIMIT) |
| Low | Limit Control Level 1 |
| Very Low | Limit Control Level 2 |
| Critical | Limit Control Level 3 |

SYSTEM OF DETERMINING POWER GENERATION MARGIN FOR VEHICLE, CONTROL METHOD THEREOF AND POWER CONTROL APPARATUS

CROSS-REFERENCE TO RELATED APPLICATION(S)

This application is based on and claims the benefit of priority to Korean Patent Application No. 10-2020-0117570, filed on Sep. 14, 2020 in the Korean Intellectual Property Office, the disclosure of which is incorporated by reference in its entirety.

TECHNICAL FIELD

The present disclosure relates to a vehicle and a control method thereof, and more particularly, to a vehicle capable of determining a power generation margin of a generator, a control method thereof, and a power control apparatus.

BACKGROUND

In general, a vehicle refers to a means of transportation that travels on a road or track using fossil fuel, electricity, or the like as a power source. For example, a vehicle can be driven using power generated by an engine.

Such a vehicle contains a variety of electrical devices to protect a driver and to provide convenience to the driver. The vehicle also contains a battery to supply a power to the electrical devices, and a generator that can also supply a power to the electrical devices and charge the battery.

The generator is powered by the vehicle's engine and can generate power. The power produced by the generator can be supplied to the battery and to various electric components of the vehicle. Power consumed by various electric components provided in a vehicle can be supplied from a generator and a battery.

However, if the electrical components of the vehicle consume a lot of power in a short period of time, a voltage drop phenomenon in which the voltage of the power supplied to the electrical components is rapidly lowered may occur. This voltage drop phenomenon may cause initialization or malfunction of the vehicle's electrical components, which may also lead to vehicle accidents.

The information included in this Background section is only for enhancement of understanding of the general background of the present disclosure and may not be taken as an acknowledgement or any form of suggestion that this information forms the prior art already known to a person skilled in the art.

SUMMARY

For the above reasons, an aspect of the disclosure is to provide a vehicle that can prevent or minimize a voltage drop phenomenon of a generator, a control method thereof, and a power control apparatus.

An aspect of the disclosure is to provide a vehicle capable of controlling operating power of electrical loads of a vehicle and charging/discharging power of a battery by power generation margin of a generator, a control method thereof, and a power control apparatus.

In accordance with one aspect of the disclosure, a vehicle includes: an electrical load; a generator; a battery; and a controller configured to control the operation of the generator based on the charging rate of the battery, identify a power generation margin representing a ratio of the power that the generator can output to the power that the generator can output to the maximum based on the duty ratio of the input voltage applied to the generator, and reduce power consumption of the electrical load based on a comparison between the power generation margin and a target margin.

The controller may be configured to set the target margin based on at least one of the charging rate of the battery, the driving state of the vehicle, the type of the electrical load, and the duty ratio of the input voltage.

The controller may be configured to set the target margin based on the sum of the first target margin based on the charging rate of the battery, the second target margin based on the driving state of the vehicle, the third target margin based on the type of the electrical load, and the fourth target margin based on the duty ratio of the input voltage.

The controller may be configured to increase the target margin based on the decrease in the charging rate of the battery.

The controller may be configured to increase the target margin based on acceleration of the vehicle.

The controller may be configured to increase the target margin based on the operation of at least one of the vehicle headlamp, air conditioning blower fan, and wiper.

The controller may be configured to increase the target margin based on an increase in the duty ratio of the input voltage to a threshold value or more during the first time.

In accordance with another aspect of the disclosure, a control method of a vehicle including an electrical load, a generator and a battery, the method includes: controlling the operation of the generator based on the charging rate of the battery; identifying a power generation margin representing a ratio of the power that the generator can additionally output to the power that the generator can output to the maximum based on the duty ratio of the input voltage applied to the generator; and reducing power consumption of the electrical load based on a comparison between the power generation margin and a target margin.

The target margin may be set based on at least one of the charging rate of the battery, the driving state of the vehicle, the type of the electrical load, and the duty ratio of the input voltage.

The target margin may be set based on the sum of the first target margin based on the charging rate of the battery, the second target margin based on the driving state of the vehicle, the third target margin based on the type of the electrical load, and the fourth target margin based on the duty ratio of the input voltage.

The target margin may be increased based on the decrease in the charging rate of the battery.

The target margin may be increased based on acceleration of the vehicle.

The target margin may be increased based on the operation of at least one of the vehicle headlamp, air conditioning blower fan, and wiper.

The target margin may be increased based on an increase in the duty ratio of the input voltage to a threshold value or more during the first time.

In accordance with another aspect of the disclosure, a power control apparatus installed in a vehicle including an electrical load, a generator, a battery and a battery sensor, the power control apparatus includes: a transceiver configured to communicate with the electrical load and the battery sensor; and a controller configured to control the operation of the generator based on the charging rate of the battery received from the battery sensor, and the controller is configured to identify a power generation margin representing a ratio of the power that the generator can additionally output to the power that the generator can output to the maximum based on the duty ratio of the input voltage applied to the generator and control the transceiver to transmit a message for reducing power consumption to the electrical load based on a comparison between the power generation margin and a target margin.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 8, 9, 10, and 11 illustrate an example of setting a target margin of a generator included in a vehicle according to an embodiment of the present disclosure.

FIG. 12 illustrates an example of a power limit level of a vehicle according to an embodiment of the present disclosure.

DETAILED DESCRIPTION

Hereinafter, the operating principle and embodiments of the present disclosure will be described with reference to the accompanying drawings.

Figure 1:
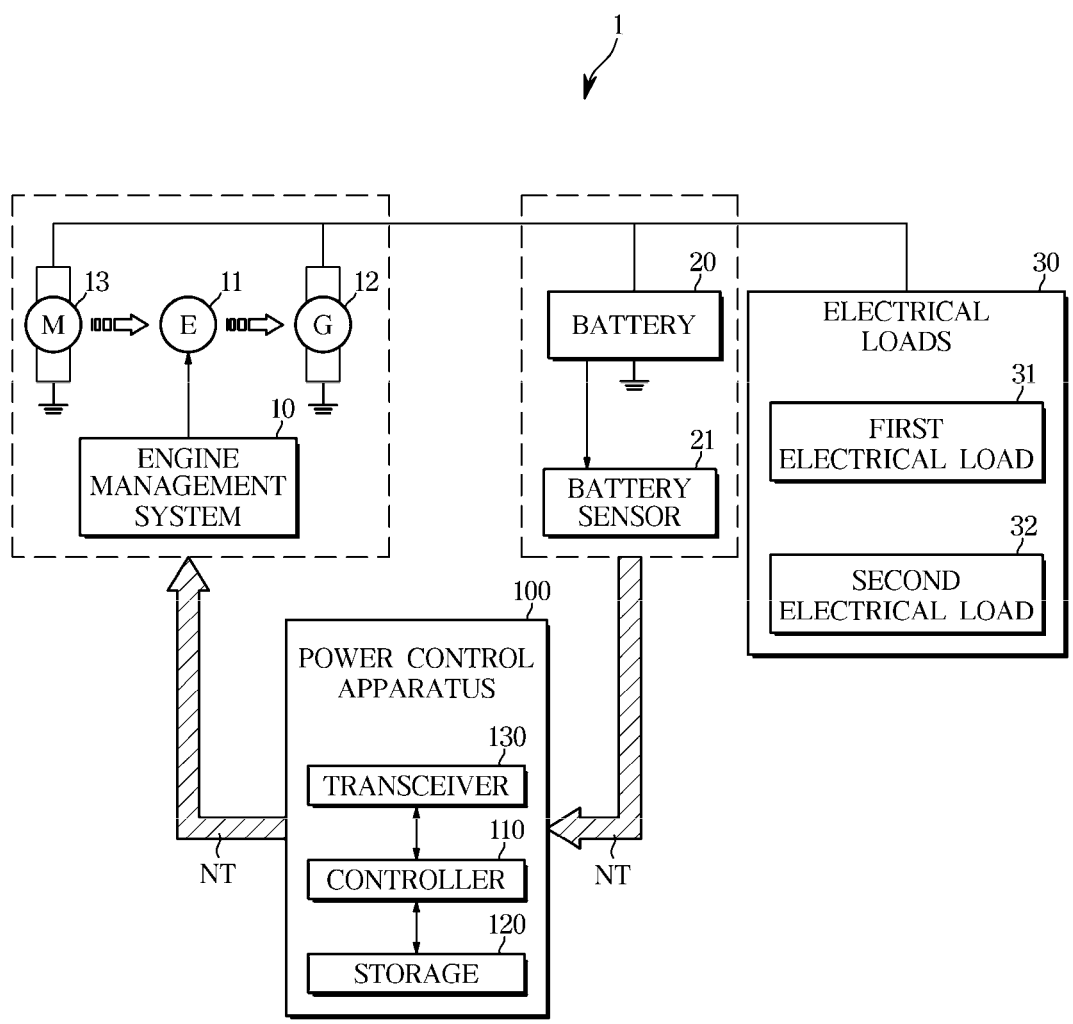
FIG. 1 illustrates power management of a vehicle according to an embodiment of the present disclosure.
Figure 2:
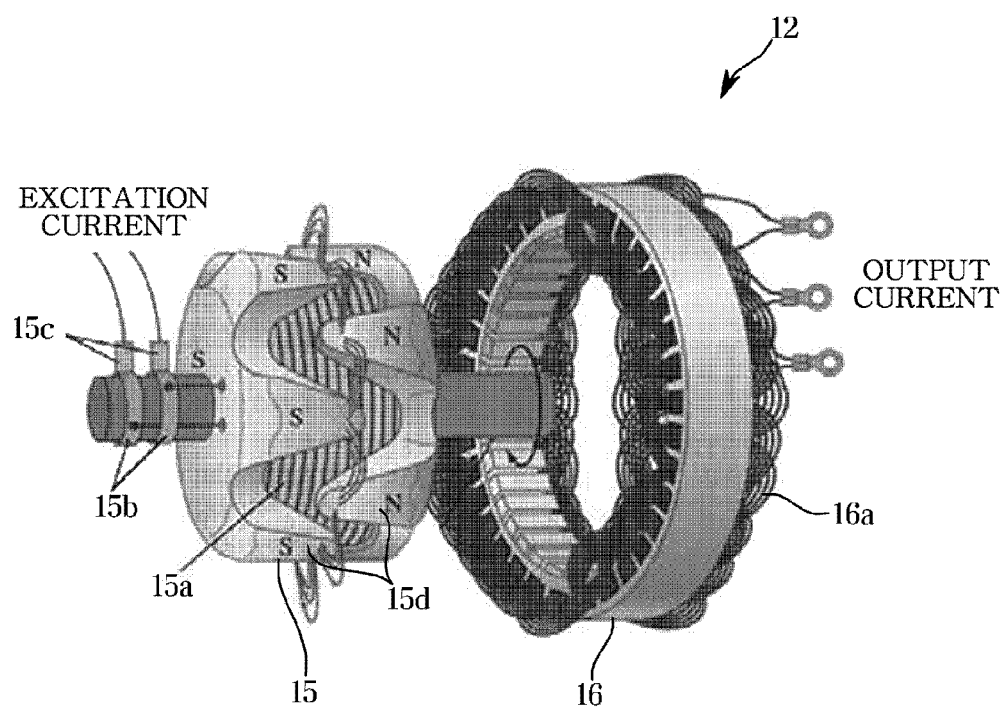
FIG. 2 illustrates the structure of a generator included in a vehicle according to an embodiment of the present disclosure.
Figure 3:
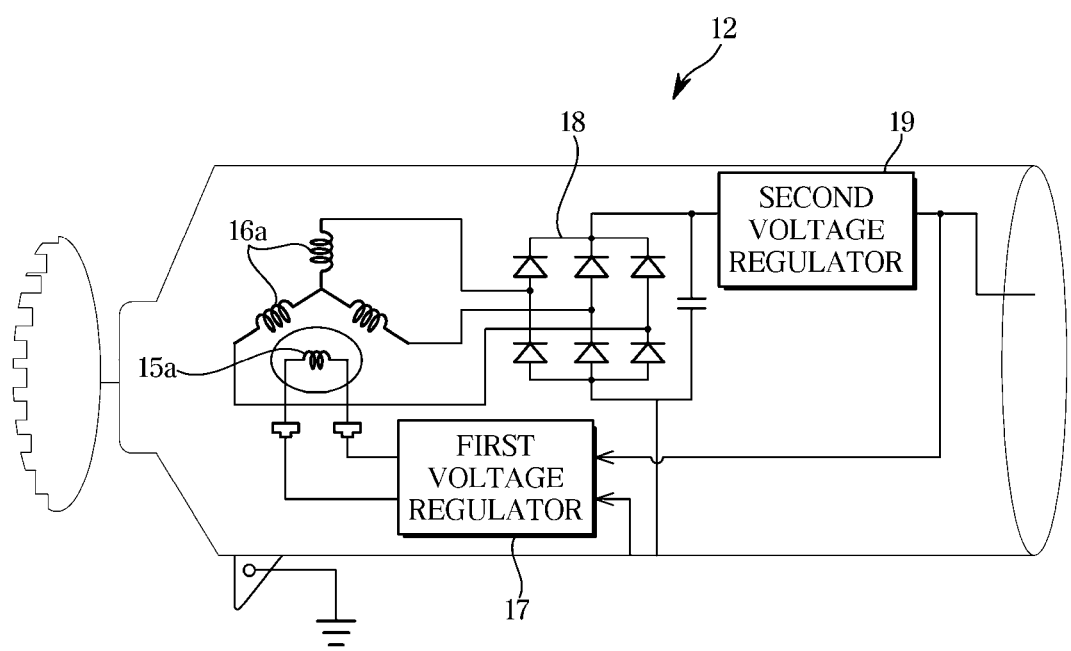
FIG. 3 illustrates a circuit of a generator included in a vehicle according to an embodiment of the present disclosure.
Figure 4:
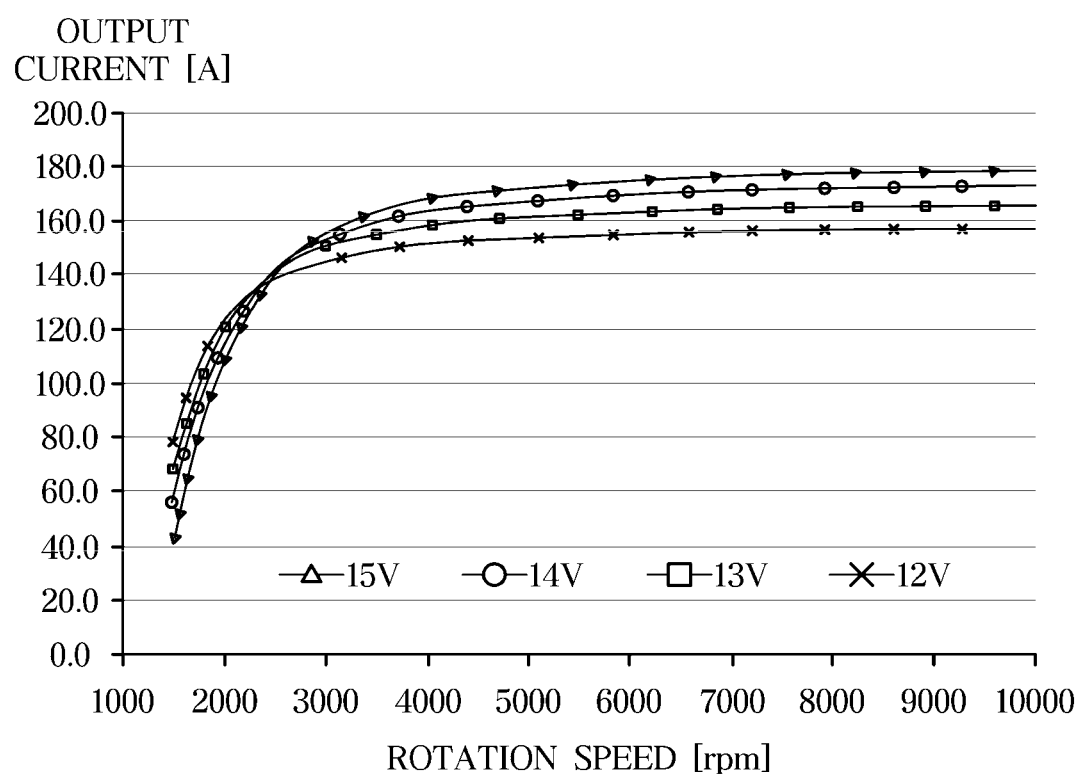
FIG. 4 is a diagram illustrating a change in output current according to a voltage command and rotation speed of a generator included in a vehicle according to an embodiment of the present disclosure.
Figure 5:
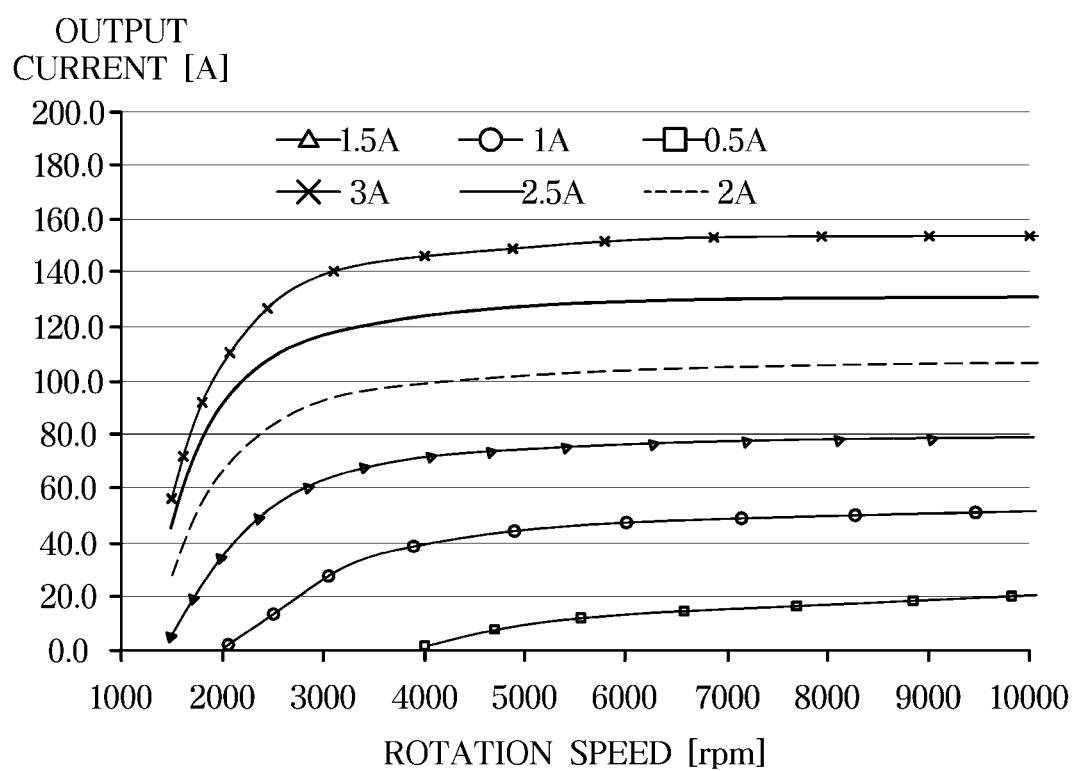
FIG. 5 illustrates a change in output current according to an excitation current and rotation speed of a generator included in a vehicle according to an embodiment of the present disclosure.
Figure 6:
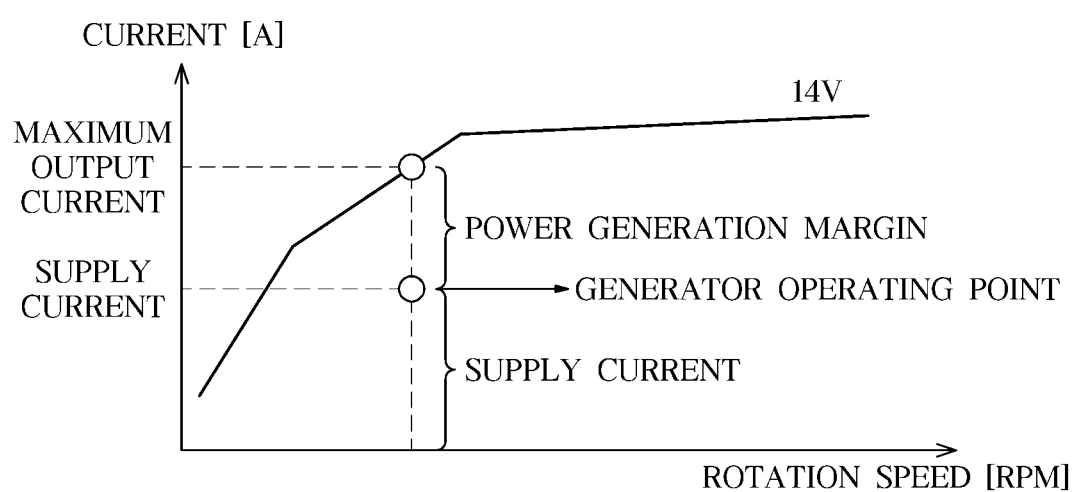
FIG. 6 illustrates a power generation margin of a generator included in a vehicle according to an embodiment of the present disclosure.

FIG. 1 illustrates power management of a vehicle according to an embodiment of the present disclosure. FIG. 2 illustrates the structure of a generator included in a vehicle according to an embodiment of the present disclosure. FIG. 3 illustrates a circuit of a generator included in a vehicle according to an embodiment of the present disclosure. FIG. 4 is a diagram illustrating a change in output current according to a voltage command and rotation speed of a generator included in a vehicle according to an embodiment of the present disclosure. FIG. 5 illustrates a change in output current according to an excitation current and rotation speed of a generator included in a vehicle according to an embodiment of the present disclosure. FIG. 6 illustrates a power generation margin of a generator included in a vehicle according to an embodiment of the present disclosure.

A vehicle 1 according to the present disclosure may include a vehicle body that forms its exterior and accommodates the driver and/or luggage, a chassis including components of the vehicle 1 other than the vehicle body, and an electrical devices that protect the driver and provide convenience to the driver.

Referring to FIGS. 1, 2, 3, 4, 5 and 6, the vehicle 1 may include an engine management system (EMS) 10, a starting motor 13, an engine 11, a generator 12, a battery 20, a battery sensor 21, electrical loads 30, and a power control apparatus 100. These electrical devices may communicate with each other through a vehicle communication network (NT). For example, electrical devices transmit and receive data through Ethernet, Media Oriented Systems Transport (MOST), Flexray, Controller Area Network (CAN), and Local Interconnect Network (LIN).

The engine management system 10 may control the engine 11 and manage the engine 11 in response to an acceleration command from a driver through an accelerator pedal. For example, the engine management system 10 may perform engine torque control, fuel economy control, and/or engine failure diagnosis. The engine management system 10 may control the generator 12 that generates power from the rotation of the engine 11.

The engine 11 may generate power by using explosive combustion of fuel, and the power of the engine 11 may be transmitted to the wheels. In this case, some of the rotational power generated by the engine 11 may be provided to the generator 12, and the generator 12 may generate power from the power of the engine 11. A part of the power produced by the generator 12 is supplied to the electrical devices of the vehicle 1, and the other part may be stored in the battery 20 of the vehicle 1.

The generator 12 is connected directly to the power control apparatus 100 or through a vehicle communication network NT, and may generate electrical energy, that is, power in response to a power generation control signal from the power control apparatus 100.

The generator 12 includes a rotor 15 that rotates together with the rotation shaft of the engine 11 and a stator 16 fixed to the vehicle body as shown in FIG. 2.

The rotor 15 includes a rotor coil 15a and a pair of pincer-shaped pole pieces 15d. The pair of pole pieces 15d may be intersected with each other to surround the rotor coil 15a. The excitation current is supplied to the rotor coil 15a through the brush 15c and the slip ring 15b, and when the excitation current is supplied to the rotor coil 15a, the pair of pole pieces 15d can be magnetized to the N pole and the S pole, respectively. Since the pair of pole pieces 15d are intersected with each other, N poles and S poles may be alternately generated around the rotor 15 along the circumferential direction. In addition, due to the N-pole and S-pole alternately generated along the circumferential direction of the rotor 15, a magnetic field that rotates while the rotor 15 rotates may be formed.

The stator 16 includes a stator coil 16a. Current is induced in the stator coil 16a due to the rotating magnetic field generated while the rotor 15 rotates. By the current induced in the stator coil 16a, the stator 16 may supply current to the battery 20 or the electrical components of the vehicle 1. In other words, the generator 12 may supply power to the battery 20 or electric components.

The output voltage and output current of the stator coil 16a are supplied to the rectifier 18. The output voltage output from the stator coil 16a is an AC voltage whose direction and size change with time, and the output current is also an AC current.

The rectifier 18 may rectify the AC voltage and AC current output from the stator coil 16a. For example, the rectifier 18 may include a diode bridge including a plurality of diodes and a DC link capacitor, as shown in FIG. 3. The DC link capacitor can stabilize the current and voltage rectified by the diode bridge. As such, the AC voltage and AC current output from the stator coil 16*a* may be converted into a DC voltage and a DC current by the rectifier 18.

The DC voltage and DC current converted by the second rectifier 18 are provided to the second voltage regulator 19. The second voltage regulator 19 may adjust or convert the output voltage of the generator 12 into a voltage command by the engine management system 10 (or a power control apparatus).

The magnitude of the DC current (or power) output from the generator 12 may depend on the rotation speed of the rotor 15 and the strength of the magnetic field generated by the rotor 15. As the rotation speed of the rotor 15 increases, the output current output from the generator 12 increases, and as the magnetic field of the rotor 15 increases, the output current output from the generator 12 may increase.

At this time, the strength of the magnetic field generated by the rotor 15 may depend on the excitation current flowing through the rotor coil 15*a*. Therefore, the output current output from the stator coil 16*a* may depend on the excitation current flowing through the rotor coil 15*a*.

The excitation current supplied to the rotor coil 15*a* may be controlled by the first voltage regulator 17 as shown in FIG. 3.

The first voltage regulator 17 may apply a pulsed voltage (square wave voltage) to the rotor coil 15*a*, and the magnitude of the excitation current flowing through the rotor coil 15*a* may depend on the duty ratio of the pulsed voltage (square wave voltage). For example, as the duty ratio of the output voltage of the first voltage regulator 17 increases, the magnitude of the excitation current flowing through the rotor coil 15*a* may also increase approximately linearly.

The first voltage regulator 17 may control the magnitude of the excitation current supplied to the rotor coil 15*a* of the generator 12 in response to a control command of the engine management system 10 (or power control apparatus). In other words, the first voltage regulator 17 may control the duty ratio of the voltage applied to the rotor coil 15*a* in response to a control command of the engine management system 10 (or power control apparatus).

For example, as shown in FIG. 3, the first voltage regulator 17 may obtain a voltage command from the engine management system 10 and obtain an output voltage (DC voltage) output from the output terminal of the generator 12. The first voltage regulator 17 may receive feedback from the output voltage of the generator 12 and compare the output voltage of the generator 12 with a voltage command.

The first voltage regulator 17 may control a duty ratio of a voltage applied to the rotor coil 15*a* based on a comparison between an output voltage of the generator 12 and a voltage command. For example, the first voltage regulator 17 may reduce the duty ratio of the input voltage based on the output voltage of the generator 12 being greater than or equal to the voltage command, and may increase the duty ratio of the input voltage based on the output voltage of the generator 12 being smaller than the voltage command.

As described above, the output voltage output by the generator 12 depends on the voltage command of the engine management system 10 (or power control apparatus), and the output current (or output power) output by the generator 12 may depend on the excitation current supplied to the generator 12 and the rotation speed of the generator 12.

When the excitation current supplied to the generator 12 is constant (for example, when the excitation current is maximum), the voltage command of the engine management system 10 and the output current of the generator 12 according to the rotation speed of the generator 12 are as shown in FIG. 4.

As shown in FIG. 4, when the voltage command of the engine management system 10 is constant, the output current of the generator 12 may increase like a log function as the rotation speed of the generator 12 increases. In addition, when the rotation speed of the generator 12 is constant, the output current of the generator 12 may increase as the voltage command of the engine management system 10 increases.

In addition, when the voltage command of the engine management system 10 is constant (when the output voltage of the generator is constant), the output current of the generator 12 according to the excitation current of the generator 12 and the rotation speed of the generator 12 is as shown in FIG. 5.

As shown in FIG. 5, when the excitation current of the generator 12 is constant, the output current of the generator 12 may increase like a log function as the rotation speed of the generator 12 increases. In addition, when the rotation speed of the generator 12 is constant, the output current of the generator 12 may increase as the excitation current of the generator 12 increases.

As such, the output current of the generator 12, that is, the output power of the generator 12, may vary greatly from 0 [A] to 150 [A] by increasing or decreasing the excitation current.

The starting motor 13 may provide power to the engine 11 to start the engine 11 while the engine 11 is stopped. The starting motor 13 may receive power from the battery 20. Since the starting motor 13 consumes a lot of power to start the engine 11, the charging rate of the battery 20 may be maintained at a charging rate of a certain level or higher (e.g., a charging rate of approximately 30% or higher) for the operation of the starting motor 13.

The battery 20 stores electrical energy generated from the power of the engine and may supply power to various electrical devices included in the vehicle 1. While the vehicle 1 is driving, the generator 12 may convert the rotational energy of the engine into electrical energy, and the battery 20 may receive and store electrical energy from the generator 12. When the power consumed by the electrical devices while the vehicle 1 is driving is greater than the power produced by the generator 12, the battery 20 may supply power to the electrical loads 30. In addition, in a parking state in which the engine 11 is stopped, the battery 20 may supply power to the electrical loads 30.

The battery sensor 21 may detect an output (output voltage, output current, etc.) of the battery 20. The battery sensor 21 may generate battery data based on an output voltage of the battery 20, an output current of the battery 20, and a temperature of the battery 20.

For example, the battery sensor 21 may determine the charging rate of the battery 20 based on the output voltage of the battery 20, the output current of the battery 20, and the temperature of the battery 20. The charging rate of the battery 20 may indicate a degree of storage of electrical energy in the battery 20. The charging rate generally has a value of 0 to 100%, and may represent a degree of charging of the battery 20 between a fully discharged state (0%) and a fully charged rate (100%). The charging rate of the battery 20 may be calculated based on an open circuit voltage (OCV) of the battery 20 and an input/output current of the battery 20.

As such, the battery sensor 21 may provide battery data, such as the charging rate of the battery 20, the age of the battery 20, and the temperature of the battery 20, to the power control apparatus 100.

The electrical loads 30 may include a first electrical load 31 for driving/braking/steering the vehicle 1 by consuming power supplied from the battery 20 or the generator 12 and a second electrical load 32 to provide convenience to the driver of the vehicle 1.

The first electrical load 31 may include, for example, an engine management system (EMS), a transmission control unit (TCU), an electronic brake control module (EBCM), and a motor driven power steering (MDPS) or the like.

The second electrical load 32 may include, for example, a body control module (BCM), an audio device, an air conditioning device (heating/ventilation/air conditioning, HVAC), a navigation device, a power seat, and a seat heater and a headlight.

The power control apparatus 100 may obtain battery data through the battery sensor 21 and control the generated power of the generator 12 based on the battery data. For example, the power control apparatus 100 may control the engine management system 10 to control the excitation current of the generator 12 (or the duty ratio of the input voltage of the generator). The power control apparatus 100 may directly control the generator 12 through a hard wire or indirectly control the generator 12 through a vehicle communication network NT.

The power control apparatus 100 may include a transceiver 130, a storage 120, and a controller 110.

The transceiver 130 may include a CAN transceiver that receives communication signals from other electrical devices of the vehicle 1 through the vehicle communication network (NT) and transmits communication signals to other electrical devices of the vehicle 1, and a communication controller to control the operation of CAN transceiver.

The CAN transceiver may receive battery data from the battery sensor 21 through the vehicle communication network (NT) and provide the battery data to the controller 110, and may receive a power generation control message to increase or decrease the power generation of the generator 12 from the controller 110 and transmit the power generation control message to the generator 12 through a vehicle communication network (NT).

As such, the power control apparatus 100 communicates with electrical devices such as the generator 12, the battery sensor 21, the engine management system 10, the first electrical load 31 and the second electrical load 32 through the transceiver 130.

The storage 120 may include a storage media that stores control data for controlling the power control apparatus 100, and a storage controller that controls storage/deletion/loading of data stored in the storage medium.

The storage medium may include a semiconductor device drive (Solid State Drive, SSD), a magnetic disk drive (Hard Disc Drive, HDD), and the like, and may store various types of data for managing the charging rate of the battery 20.

Further, the storage medium may store data related to the operation of the generator 12. For example, the storage medium may store a table including a voltage command, rotation speed, and excitation current of the generator 12 and an output current of the generator 12 depending on the voltage command, rotation speed, and excitation current of the generator 12, as shown in FIGS. 4 and 5.

The storage controller may store data in the storage medium according to the storage signal of the controller 110 and output data stored in the storage medium to the controller 110 according to the loading signal of the controller 110.

The controller 110 may include a memory for storing a control program and/or control data for controlling the power control apparatus 100, and a processor for generating a control signal according to the control program and control data stored in the memory.

The memory may provide programs and/or data to the processor according to the memory control signal of the processor. For example, the memory may temporarily store communication data received through the transceiver 130 and/or storage data stored in the storage 120.

The memory may include a volatile memory such as Static Random Access Memory (S-RAM), Dynamic Random Access Memory (D-RAM), and a nonvolatile memory such as Read Only Memory (ROM), Erasable Programmable Read Only Memory (EPROM), Electrically Erasable Programmable Read Only Memory (EEPROM).

The processor may process data according to a program provided from the memory and generate a control signal according to the processing result. For example, the processor may process communication data received through the transceiver 130 and/or storage data stored in the storage 120 and output a power generation control signal for controlling the power generation operation of the generator 12.

The processor may include various logic circuits and operation circuits. The processor and the memory may be implemented as a single chip or may be implemented as separate chips.

The controller 110 may control the power generation operation of the generator 12 based on battery data such as a charging rate (SoC) of the battery 20 and an aging degree (SoH) of the battery 20. For example, when the charging rate (SoC) of the battery 20 is smaller than the reference value, the controller 110 may output a power generation control signal for increasing a duty ratio of an input voltage of the first voltage regulator 17 in order to increase the output current of the generator 12. In addition, when the charging rate (SoC) of the battery 20 is greater than the reference value, the controller 110 may output a power generation control signal for reducing a duty ratio of an input voltage of the first voltage regulator 17 in order to reduce the output current of the generator 12.

In this case, the output voltage output by the generator 12 depends on the voltage command, and the voltage command may depend on the charging rate (SoC) of the battery 20 for charging and discharging the battery 20. In addition, the output current (or output power) output by the generator 12 depends on the excitation current supplied to the generator 12 and the rotation speed of the generator 12, and the rotation speed of the generator 12 may depend on the rotation speed of the engine 11 depending on the driver's will to accelerate and/or decelerate.

Therefore, the controller 110 may control the first voltage regulator 17 to adjust the excitation current of the generator 12, that is, the duty ratio of the input voltage of the generator 12 in order to control the output current of the generator 12.

The output power (or output current) provided by the generator 12 to the battery 20 and electrical loads 30 may vary according to the duty ratio of the input voltage of the generator 12.

For example, the generator 12 may output some of the maximum supplyable currents according to the duty ratio of the input voltage. As shown in FIG. 6, the supply current supplied by the generator 12 to the battery 20 and the electrical load 30 is a part of the maximum output current (ie, output power) that can be output. In other words, the generator 12 may supply additional power to the battery 20 and the electrical load 30, and this margin is referred to as a "power generation margin".

Here, "power generation margin" represents the difference between the maximum output current that the generator 12 can output at the rotation speed of the engine 11 determined by the driver and the output current provided by the generator 12 to the battery 20 and electrical loads 30. In other words, the "power generation margin" may refer to the extra power or extra current that the generator 12 can additionally supply to the battery 20 and electrical loads 30. As such, the power generation margin can be inversely proportional to the output current of the generator 12.

In addition, an increase in the power generation margin leads to a decrease in the driving torque of the generator 12, and torque loss of the engine 11 may be reduced. This may improve the fuel economy of the engine 11.

The controller 110 may control the generator 12 to secure a "power generation margin" of a certain level or more in order to stably supply power (or current) to the battery 20 and the electrical loads 30.

For example, when the MDPS consumes a lot of power in a short time, the voltage output from the generator 12 and the battery 20 may rapidly decrease due to the internal resistance of the generator 12 (hereinafter referred to as "voltage drop"). This voltage drop may cause initialization or malfunction of the electrical loads 30.

In addition, if the charging rate (SoC) of the battery 20 is low, as the ratio of the charging current of the battery 20 to the output current of the generator 12 increases, making it vulnerable to rapid power consumption of electrical loads 30. When the driver's will to accelerate is detected, it is required to secure a power generation margin in order to minimize the torque loss of the engine 11. When operating an electrical load sensitive to a driving voltage, securing a power generation margin is required for stable operation of the electrical load. When the engine 11 rotates at a low speed, it is required to secure a power generation margin for stable power supply. In addition, when there is an abnormality in power supply such as removal of the battery 20 or failure of the generator 12, it is also required to secure a power generation margin.

In order to prevent voltage drop, the controller 110 may control the generator 12 to secure a "power generation margin" above a certain level. For example, the controller 110 may obtain a rotation speed of the engine 11, a voltage command of the generator 12, and a duty ratio of an input voltage of the generator 12. The controller 110 may estimate output current and power generation margin supplied to the battery 20 and electrical loads 30 by using the table stored in the storage 120.

Alternatively, the controller 110 may estimate the power generation margin rate based on the duty ratio of the input voltage input to the generator 12 (the duty ratio of the voltage output from the first voltage regulator). Here, the power generation margin rate may represent a ratio of the power generation margin to the maximum output current of the generator 12 at a predetermined rotation speed of the engine 11.

The controller 110 may obtain a power generation margin rate based on a difference between "1 (100%)" and a duty ratio of the input voltage of the generator 12.

The controller 110 may set a target margin rate based on a charging rate of the battery 20 and a driving state of the vehicle 1 and compare the target margin rate with the current power generation margin rate. The controller 110 may limit power consumption of the electrical loads 30 to increase the power generation margin based on the current power generation margin rate being less than the target margin rate. For example, since the second electrical load 32 is less related to the driving of the vehicle 1 and is to provide the driver's convenience, the controller 110 may limit the power consumption of the second electrical load 32.

In addition, in order to reduce the charging current of the battery 20, the controller 110 may reduce the output voltage of the generator 12, that is, the output voltage of the second voltage regulator 19. For example, when the charging rate (SoC) of the battery 20 is low, the charging current of the battery 20 may increase. Therefore, when vehicle 1 is in a stopped state (when the engine is in an idle state), the controller 110 may decrease the output voltage of the second voltage regulator 19 in order to reduce the charging current of the battery 20. On the other hand, when vehicle 1 is not in a stopped state (when the engine is not in an idle state), the controller 110 may limit power consumption of the second electrical load 32 to charge the battery 20.

As such, the power control apparatus 100 may control power consumption of the electrical loads 30 based on the power generation margin rate and the target margin rate of the generator 12.

Hereinafter, the operation of the vehicle 1 and the power control apparatus 100 will be described in detail.

Figure 7:
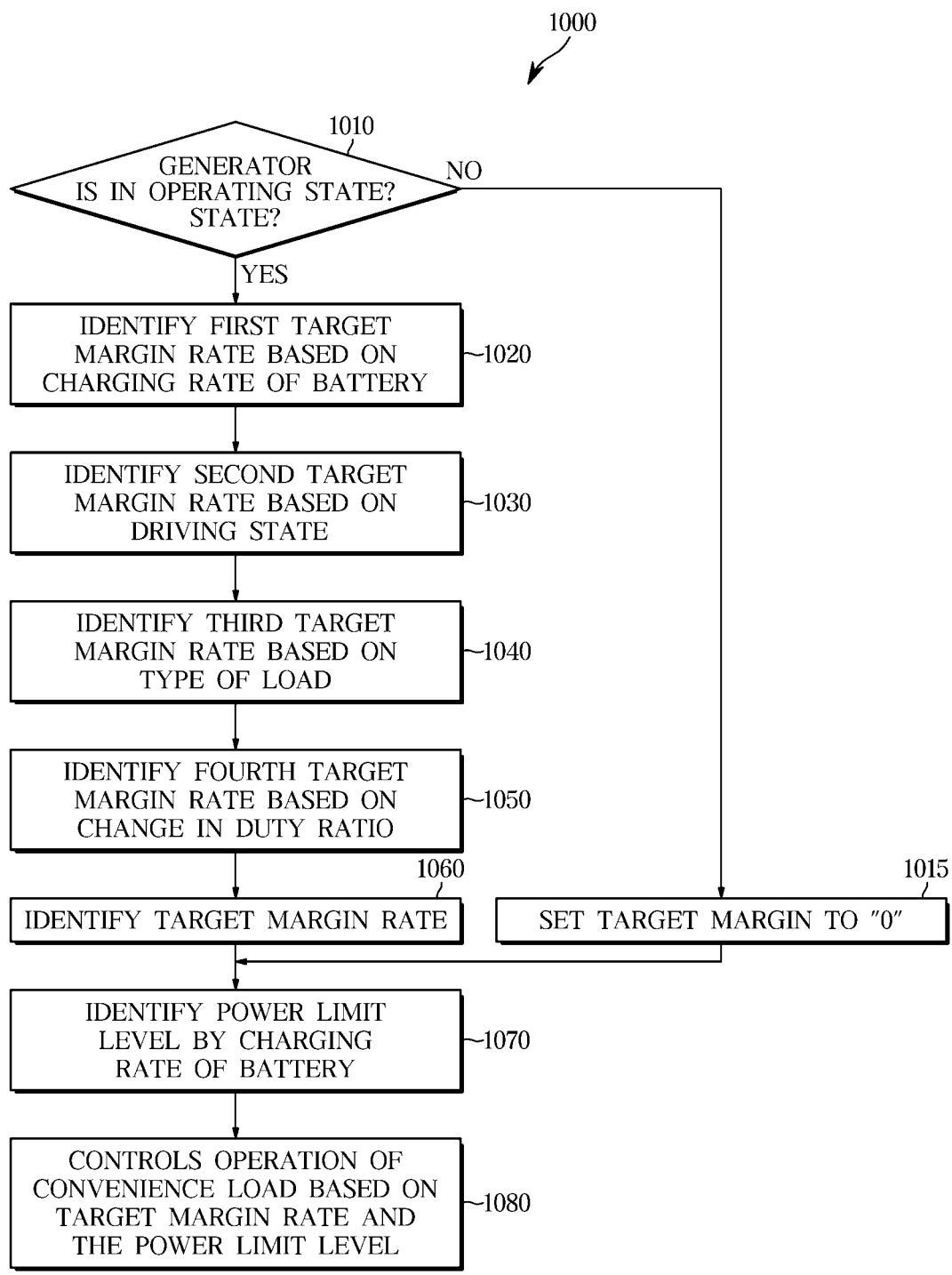
FIG. 7 illustrates the operation of a vehicle according to an embodiment of the present disclosure.

FIG. 7 illustrates the operation of a vehicle according to an embodiment of the present disclosure. FIGS. 8, 9, 10, and 11 illustrate an example of setting a target margin of a generator included in a vehicle according to an embodiment of the present disclosure. FIG. 12 illustrates an example of a power limit level of a vehicle according to an embodiment of the present disclosure.

Along with FIGS. 7, 8, 9, 10, 11 and 12, the operation 1000 of the vehicle 1 will be described.

The vehicle 1 identifies whether the generator 12 is in an operating state (1010).

The generator 12 can be deactivated, for example, when the vehicle 1 is parked or when the vehicle 1 is started by an Idle Stop & Go (ISG) system.

The power control apparatus 100 may identify whether the generator 12 is in an operating state based on the state of the vehicle 1.

When the generator 12 is in an operating state (YES in 1010), the vehicle 1 identifies the first target margin rate based on the charging rate of the battery 20 (1020).

The power generation margin of the generator 12 may be affected by the charging rate (SoC) of the battery 20. For example, if the charging rate (SoC) of the battery 20 is high, a voltage drop is unlikely to occur even with a sudden power consumption by the electrical loads 30. On the other hand, when the charging rate (SoC) of the battery 20 is low, a voltage drop is likely to occur due to the rapid power consumption of the electrical loads 30. This is because the ratio of the charging current of the battery 20 among the output current of the generator 12 increases due to the increase in the charging current of the battery 20 when the charging rate (SoC) of the battery 20 is low.

Therefore, when the charging rate (SoC) of the battery 20 is low, a high power generation margin rate is required.

For example, as shown in FIG. 8, when the charging rate (SoC) of the battery 20 is out of the effective range (Soc<0, Soc<100%), the power control apparatus 100 may set the first target margin rate by charging and discharging the battery 20 to 0%. When the charging rate (SoC) of the battery 20 is high (e.g., 86%<SoC≤100%), the power control apparatus 100 may set the first target margin rate to 0%.

When the charging rate (SoC) of the battery 20 is normal (e.g., 80%<SoC≤86%), the power control apparatus 100 may set the first target margin rate to 5%. When the charging rate (SoC) of the battery 20 is low (e.g., 65%<SoC≤80%), the power control apparatus 100 may set the first target margin rate to 10%. When the charging rate (SoC) of the battery 20 is very low (e.g., 50%<SoC≤65%), the power control apparatus 100 may set the first target margin rate to 20%. In addition, when the charging rate (SoC) of the battery 20 is critical (e.g., 0%<SoC≤50%), the power control apparatus 100 may set the first target margin rate to 30%.

The vehicle 1 identifies the second target margin rate based on the driving state (1030).

The target margin rate is affected by the driving state of the vehicle 1. For example, when a driver's will to accelerate is detected, an increase in power generation margin is required to minimize torque loss of the engine 11. In addition, when the driver's will to decelerate is detected, reduction of the power generation margin is required for regenerative braking. Therefore, a high power generation margin rate is required during acceleration of the vehicle 1.

For example, as shown in FIG. 9, when the vehicle 1 is stopped (when the engine is in an idle state), the power control apparatus 100 may set the second target margin rate by the driving state to 0%. When the vehicle 1 is driving at an acceleration, the power control apparatus 100 may set the second target margin rate to +10%. When the vehicle 1 is driving at a reduced speed, the power control apparatus 100 may set the second target margin rate to −10%. In addition, when the vehicle 1 is driving at a constant speed, the power control apparatus 100 may set the second target margin rate to 0%.

The vehicle 1 identifies the third target margin rate based on the type of the operated load (1040).

Among electrical loads, for example, headlamps, air conditioning blower fans, and wipers may malfunction due to low driving voltage. For example, due to a low driving voltage, the head lamp may flicker, the rotation speed of the air conditioning blower fan may decrease, or the wiper may stop operating. As such, when an electrical load sensitive to a driving voltage is running, securing a power generation margin is required.

For example, as illustrated in FIG. 10, if an electrical load sensitive to a driving voltage is not running, the power control apparatus 100 may set the third target margin rate to 0%. When an electrical load sensitive to the driving voltage is running (for example, when at least one of the headlamp, air conditioning blower fan, and wiper is running), the power control apparatus 100 may set the third target margin rate to +10%.

The vehicle 1 identifies the fourth target margin rate based on the change in the duty ratio of the input voltage of the generator 12 (1050).

The rapid increase in power consumption of the electrical loads 30 causes an increase in the duty ratio of the input voltage of the generator 12 (the duty ratio of the output voltage of the first voltage regulator). Such a rapid increase in power consumption of the electrical loads 30 may continue repeatedly. Therefore, it is required to secure a power generation margin due to an increase in the duty ratio of the input voltage of the generator 12. The power control apparatus 100 may identify a rapid increase in the duty ratio by using a high pass filter.

For example, as illustrated in FIG. 11, when an instantaneous increase in the duty ratio of the input voltage of the generator 12 is detected, the power control apparatus 100 may set the fourth target margin rate to 20%. Otherwise, the power control apparatus 100 may set the fourth target margin rate to 0%.

The vehicle 1 identifies the target margin rate of the generator 12 (1060).

The power control apparatus 100 may identify the target margin rate of the generator 12 based on the sum of the first target margin rate, the second target margin rate, the third target margin rate, and the fourth target margin rate.

The vehicle 1 identifies the power limit level by the charging rate (SoC) of the battery 20 (1070).

When the charging rate (ScC) of the battery 20 is low, the power control apparatus 100 may limit the power consumption of the electrical loads 30 for smooth start-up after start-off. For example, as shown in FIG. 12, when the charging rate (SoC) of the battery 20 is low (e.g., 65%<SoC≤80%), the power control apparatus 100 may set the power limit level to the first level. When the charging rate (SoC) of the battery 20 is very low (e.g., 50%<SoC≤65%), the power control apparatus 100 may set the power limit level to the second level. In addition, when the charging rate (SoC) of the battery 20 is critical (e.g., 0%<SoC≤50%), the power control apparatus 100 may set the power limit level to the third level.

The power control apparatus 100 may limit power consumption of the second electrical load 32, which is a convenience load, according to the power limit level.

The vehicle 1 controls the operation of the electrical loads 30 based on the target margin rate of the generator 12 and the power limit level of the electrical loads 30 (1080).

The power control apparatus 100 may identify the power generation margin rate of the generator 12 based on the duty ratio of the input voltage of the generator 12 and compare the power generation margin rate with the target margin rate. The power control apparatus 100 may limit power consumption of electrical loads 30 based on the power generation margin rate being less than the target margin rate.

For example, when the charging rate (SoC) of the battery 20 is 50% and the vehicle 1 is accelerating, the power control apparatus 100 may identify a first target margin rate of 10% by the charging rate (SoC) of the battery 20 and a second target margin rate of 10% by the driving state of the vehicle 1, and identify the target margin rate of 20% of the generator 12. In addition, the power control apparatus 100 may identify the power limit level of 2 level by the charging rate (SoC) of the battery 20. The power control apparatus 100 may lower the operation level of the air conditioner and lower the operation level of the seat heater in order to secure a target margin rate of 20%.

Here, when the vehicle 1 is decelerated, the power control apparatus 100 may identify the second target margin rate of −10% by the driving state of the vehicle 1, and the target margin rate of the generator 12 can be changed to 0%. The power control apparatus 100 may maintain the operating level of the air conditioner and maintain the operating level of the seat heater in order to secure a target margin ratio of 0%.

In addition, when the duty ratio of the input voltage of the generator 12 is increased by the operation of the MDPS, the power control apparatus 100 may identify the fourth target margin rate of 20%, and the target margin rate of the generator 12 may be changed to 20%. The power control apparatus 100 may lower the operation level of the air conditioner and lower the operation level of the seat heater in order to secure a target margin rate of 20%.

By the above operation 1000, initialization or malfunction of the electrical loads 30 due to voltage drop may be prevented or reduced.

According to an aspect of the present disclosure, a vehicle capable of preventing or minimizing a voltage drop phenomenon of a generator by using a power generation margin of a generator, a control method thereof, and a power control apparatus can be provided.

According to an aspect of the present disclosure, operating power of electrical loads of a vehicle and charging/discharging power of a battery may be controlled by a power generation margin of a generator.

What is claimed is:

1. A vehicle comprising:
    an electrical load;
    a generator;
    a battery; and
    a controller configured to:
        control an operation of the generator based on a charging rate of the battery;
        identify, based on a duty ratio of an input voltage applied to the generator, a power generation margin representing a ratio of a power that the generator is operable to output to a maximum power;
        reduce power consumption of the electrical load based on a comparison between the power generation margin and a target margin; and
        set the target margin based on a sum of a first target margin based on the charging rate of the battery, a second target margin based on a driving state of the vehicle, a third target margin based on a type of the electrical load, and a fourth target margin based on the duty ratio of the input voltage.

2. The vehicle according to claim 1, wherein the controller is configured to increase the target margin based on a decrease in the charging rate of the battery.

3. The vehicle according to claim 1, wherein the controller is configured to increase the target margin based on an acceleration of the vehicle.

4. The vehicle according to claim 1, wherein the controller is configured to increase the target margin based on an operation of at least one of a vehicle headlamp, an air conditioning blower fan, and a wiper.

5. The vehicle according to claim 1, wherein the controller is configured to increase the target margin based on an increase in the duty ratio of the input voltage to a threshold value or more for a predetermined period of time.

6. A control method of a vehicle, which comprises an electrical load, a generator and a battery, the method comprising:
    controlling an operation of the generator based on a charging rate of the battery;
    identifying, based on a duty ratio of an input voltage applied to the generator, a power generation margin representing a ratio of a power that the generator is operable to output to a maximum power based on the duty ratio of the input voltage applied to the generator; and
    reducing power consumption of the electrical load based on a comparison between the power generation margin and a target margin,
    wherein the target margin is set based on a sum of a first target margin based on the charging rate of the battery, a second target margin based on a driving state of the vehicle, a third target margin based on a type of the electrical load, and a fourth target margin based on the duty ratio of the input voltage.

7. The control method according to claim 6, wherein the target margin is increased based on a decrease in the charging rate of the battery.

8. The control method according to claim 6, wherein the target margin is increased based on an acceleration of the vehicle.

9. The control method according to claim 6, wherein the target margin is increased based on an operation of at least one of a vehicle headlamp, an air conditioning blower fan, or a wiper.

10. The control method according to claim 6, wherein the target margin is increased based on an increase in the duty ratio of the input voltage to a threshold value or more for a predetermined period of time.

11. A power control apparatus of a vehicle which comprises an electrical load, a generator, a battery and a battery sensor, the power control apparatus comprising:
    a transceiver configured to communicate with the electrical load and the battery sensor; and
    a controller configured to:
        control an operation of the generator based on a charging rate of the battery received from the battery sensor;
        identify a power generation margin representing a ratio of a power that the generator is operable to output to a maximum power based on a duty ratio of an input voltage applied to the generator;
        control the transceiver to transmit a message for reducing power consumption to the electrical load based on a comparison between the power generation margin and a target margin; and
        set the target margin based on a sum of a first target margin based on the charging rate of the battery, a second target margin based on a driving state of the vehicle, a third target margin based on a type of the electrical load, and a fourth target margin based on the duty ratio of the input voltage.

12. The power control apparatus according to claim 11, wherein the controller is configured to increase the target margin based on an acceleration of the vehicle.

13. The power control apparatus according to claim 11, wherein the controller is configured to increase the target margin based on an operation of at least one of a vehicle headlamp, an air conditioning blower fan, or a wiper.

14. The power control apparatus according to claim 11, wherein the controller is configured to increase the target margin based on an increase in the duty ratio of the input voltage to a threshold value or more for a predetermined period of time.

* * * * *

UNITED STATES PATENT AND TRADEMARK OFFICE
CERTIFICATE OF CORRECTION

| | |
|---|---|
| PATENT NO. | : 11,870,290 B2 |
| APPLICATION NO. | : 17/306074 |
| DATED | : January 9, 2024 |
| INVENTOR(S) | : Sang Jae Han et al. |

It is certified that error appears in the above-identified patent and that said Letters Patent is hereby corrected as shown below:

On the Title Page

Item (73) Assignees:
"AVUNDAI MOTOR COMPANY, Seoul (KR)
KIA COPORATION, Seoul (KR)"

Should read:
HYUNDAI MOTOR COMPANY, Seoul (KR)
KIA CORPORATION, Seoul (KR)

Signed and Sealed this
Third Day of September, 2024

Katherine Kelly Vidal
*Director of the United States Patent and Trademark Office*